United States Patent [19]

Calero

[11] Patent Number: 5,163,214
[45] Date of Patent: Nov. 17, 1992

[54] ROLLING DAM METHOD FOR MAKING WATER HEATER

[76] Inventor: Manuel G. Calero, 1918 Brook Dr., Camden, S.C. 29020

[21] Appl. No.: 697,132

[22] Filed: May 8, 1991

[51] Int. Cl.⁵ .............................................. B23P 19/04
[52] U.S. Cl. ........................................ 29/460; 29/434; 29/436; 29/890.036; 29/451; 264/46.5; 220/444
[58] Field of Search ............... 29/434, 436, 890.03, 29/890.036, 455.1, 460, 450, 451; 264/46.5, 46.6, 261, 262; 220/444

[56] References Cited

U.S. PATENT DOCUMENTS

| | | | |
|---|---|---|---|
| 2,179,959 | 11/1939 | Schroedter | 403/224 |
| 3,521,604 | 7/1970 | Nickel | 122/13.2 |
| 4,372,028 | 2/1983 | Clark et al. | 29/460 |
| 4,477,399 | 10/1984 | Tilton | 208/251 H |
| 4,744,488 | 5/1988 | Nelson | 220/444 |
| 4,749,532 | 6/1988 | Pfeffer | 269/46.5 |
| 4,878,482 | 11/1989 | Pfeffer | 126/375 |
| 4,901,676 | 2/1990 | Nelson | 122/19 |
| 4,957,097 | 9/1990 | Chevalier et al. | 126/373 |
| 4,972,967 | 11/1990 | Nelson | 220/444 |
| 5,002,709 | 3/1991 | Chevalier et al. | 264/46.5 |

Primary Examiner—Joseph M. Gorski
Assistant Examiner—David P. Bryant

[57] ABSTRACT

An annular resilient compressible flexible-urethane dam (10) is placed around the inner storage tank (14) of a water heater. The dam has a free-state inner diameter (24) slightly less than the outer diameter of the tank, and a free-state outer diameter (26) slightly greater than the inner diameter of the outer jacket (18). The outer jacket (18) is moved downwardly over the tank (14) to engage the dam (10) along the inner surface (20) of the jacket (18). The dam (10) is round (28) in lateral cross-section and rolls (FIG. 4) an equal distance along each of the outer surface (12) of the tank (14) and the inner surface (20) of the jacket (18) as the jacket is moved downwardly to its final position (FIG. 5). Foamed insulation (40) is then introduced as a liquid into the annular space (22) between the tank (14) and the jacket (18) and hardens to form an annular insulation layer around the tank (14). The dam (10) prevents leakage of the liquid therepast.

5 Claims, 1 Drawing Sheet

ROLLING DAM METHOD FOR MAKING WATER HEATER

FIELD OF THE INVENTION

The invention relates to a method for making insulated fluid storage units, including hot water heaters.

BACKGROUND

Hot water heaters for domestic and other applications include an inner storage tank having an associated heating unit for heating water in the tank. The tank is enclosed with suitable insulation to retain the heat and minimize the necessity for frequent reheating. An outer aesthetically pleasing jacket or shell is provided to enclose the insulation.

A highly satisfactory insulating material is expanded foamed insulation such as expanding foam polyurethane. The insulation is applied in a resinous liquid state into the annular space between the inner storage tank and the outer jacket and foams and expands and hardens to produce a rigid and closely adhering insulating enclosure about the inner tank. For further background, reference is made to U.S. Pat. Nos. 3,521,604 and 4,749,532.

A dam is provided in the annular space between the inner tank and the outer jacket, and prevents leakage of the resinous liquid therepast during the foaming operation. Various types of dams are known in the prior art.

In Clark et al U.S. Pat. No. 4,372,028 a flexible expandable bag 14 is provided around the inner tank in the form of an annular ring or doughnut. After the jacket is installed over the tank, the bag is filled with foam material which expands such that the bag engages the inner surface of the outer jacket and forms a sealing dam. Tilton U.S. Pat. No. 4,477,399 shows an inflatable tube 24 providing a dam in the annular space between the inner tank and the outer jacket. Nelson U.S. Pat. No. 4,901,676 shows an annular dam 24 provided by an envelope 26 filled with resilient insulation material 28 and from which air is removed to shrink same and allow the outer jacket to be installed, after which air is allowed back into the envelope such that it expands into abutting contact with both the inner tank and the outer jacket, to provide a sealing dam. Another type of expanding dam is shown in Pfeffer et al U.S. Pat. No. 5,002,709 wherein a band of foamable resin is applied to either the outer surface of the tank or the inner surface of the jacket, which band expands radially to form the dam. In the noted systems, the dam has an initial smaller width to allow the outer jacket to be installed, followed by expansion to a wider width to form the sealing dam.

Pfeffer U.S. Pat. No. 4,749,532 shows a layer of fiberglass 15 banded or cinched to the inner tank and forming the dam. A flexible plastic sheet apron 23 is provided over the tank and dam, and protects the fiberglass dam against tearing or snagging as the outer jacket 12 is slid downwardly over the tank. After the jacket is installed, the apron is removed, and the foam insulation is introduced into the annular cavity. Pfeffer U.S. Pat. No. 4,878,482 shows a dam provided by a semi-rigid support element 17 affixed to the inner tank and an outer flexible sealing element 18 in sealing engagement with the outer jacket. Chevalier et al U.S. Pat. No. 4,957,097 shows a dam provided by a flexible strip 19 secured to the outer surface of the inner tank and having an outer lip 22 against which the outer jacket rides while it is being installed. In the assembly methods of Pfeffer '532 and '482 and Chevalier et al, the dam is initially attached to either the inner tank or the outer jacket, followed by installation of the jacket during which the dam is compressed or deflected. It is also known in the prior art to provide an annular resilient compressible pre-formed polymeric sponge-like material dam, e.g., a pre-formed polyurethane foam annular ring or doughnut, around the inner tank, and then installing the jacket, with or without an apron, which jacket slides past and slightly compresses the dam.

It is also known in prior art assembly methods to install the dam after the outer jacket has been installed over the inner storage tank. For example, in Nelson U.S. Pat. No. 4,972,967, the outer jacket 14 is installed over the inner tank 12, after which the dam 22a-22h is pushed downwardly into the annular space between the tank and jacket until stopped against an abutment 50.

SUMMARY

The present invention provides an assembly method which avoids the need to inflate or expand an annular dam after installation of the outer jacket as in Clark et al, Tilton and Nelson '676. The invention eliminates the sliding of the outer jacket against a dam secured on the inner tank as in Pfeffer '482 and Chevalier et al, and the need for an apron as in Pfeffer '532 if such sliding contact is undesired. The invention further eliminates the need to install the dam after installation of the jacket as in Nelson '967.

The present invention provides an installation method which rolls the dam into place during installation of the outer jacket. The dam is an annular resilient compressible member having a circular circumference in lateral cross section, and which rolls along the outer surface of the inner tank and the inner surface of the outer jacket during installation. The method of the present invention eliminates the above noted pre and post installation steps required for the dam.

DETAILED DESCRIPTION

Figure 1:
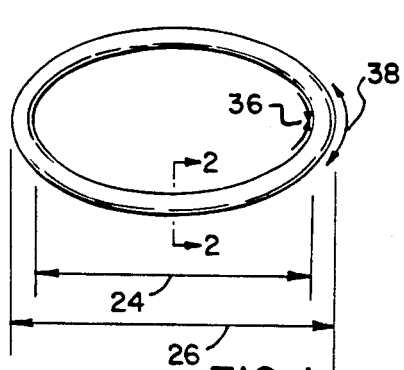
FIG. 1 shows a dam used in the method of the present invention.

FIG. 1 shows an annular resilient compressible dam 10, preferably of a pre-formed polymeric material, preferably flexible urethane. The dam is placed along the outer cylindrical surface 12, FIG. 3, of an inner storage tank 14 below the pressure relief valve spud 16. Outer jacket 18, having an inner cylindrical surface 20, is axially aligned with the tank, FIG. 3. The inner cylindrical surface 20 of the jacket has an inner diameter greater than the outer diameter of tank 14. Jacket 18 is axially moved downwardly over tank 14 to form an annular space 22 between the tank and jacket and to roll dam 10, FIG. 4, in the annular space along the outer surface 12 of the tank and the inner surface 20 of the jacket, to the position shown in FIG. 5.

Figure 2:
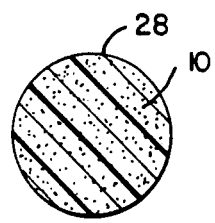
FIG. 2 is a lateral cross sectional view taken along line 2—2 of FIG. 1.

Dam 10 has a free-state inner diameter 24 slightly less than the outer diameter of tank 14. Dam 10 has a free-state outer diameter 26 slightly greater than the inner diameter of jacket 18. Dam 10 has a circular circumference 28, FIG. 2, in lateral cross section such that a point 30, FIG. 4, on such circumference moves substantially in a cycloid 32 as dam 10 rolls in annular space 22 along the outer surface 12 of tank 14 and inner surface 20 of jacket 18, as jacket 18 moves axially downwardly as shown at arrow 34. Dam 10 rolls an equal distance along each of the outer surface 12 of tank 14 and the inner surface 20 of jacket 18. Dam 10 rolls the entire length of such distance, without sliding. During rolling, the dam arcuately compresses along arcuate direction 36 along outer surface 12 of tank 14, and arcuately expands along arcuate direction 38 along inner surface 20 of jacket 18.

Figure 5:
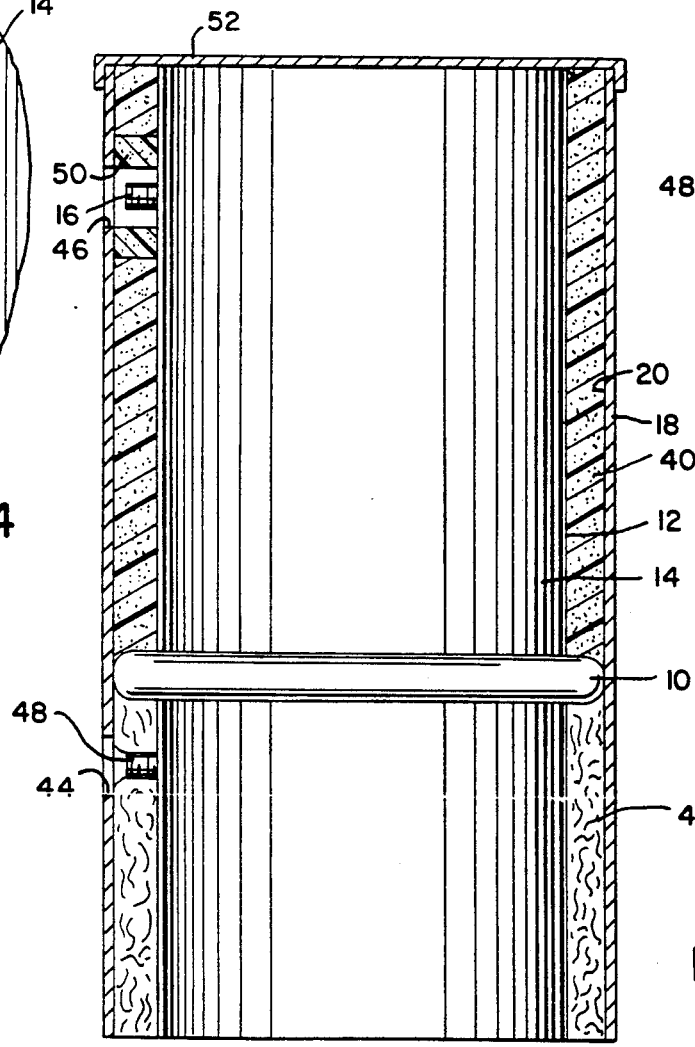
FIG. 5 shows a completed assembly.

Foam insulation is applied in a resinous liquid state into annular space 22 and foams and expands and hardens to produce a rigid and closely adhering insulating enclosure 40, FIG. 5, around tank 14. For further background regarding foamed insulation, reference is made to U.S. Pat. NoS. 3,521,604 and 4,749,532, incorporated herein by reference. Dam 10 prevents leakage of the resinous liquid therepast. The annular space below the dam is insulated by wrapping a fiberglass blanket 42 around the bottom portion of the tank prior to installation of the jacket. The jacket has access openings 44 and 46 for the thermostat connection spud 48 and the pressure relief valve spud 16, respectively. A rectangular or other shape collar dam 50 is inserted through opening 46 and placed around spud 16 prior to the foaming operation. Dam 50 is a pre-formed polyurethane foam member having a central cut-out opening to receive spud 16, and prevents leakage of the foaming resinous liquid therepast to block the liquid from reaching the spud, as is known in the art, U.S. Pat. NoS. 4,477,399, 4,744,488, and 4,901,676. The top of the jacket is closed by a top cover 52.

Figure 3:
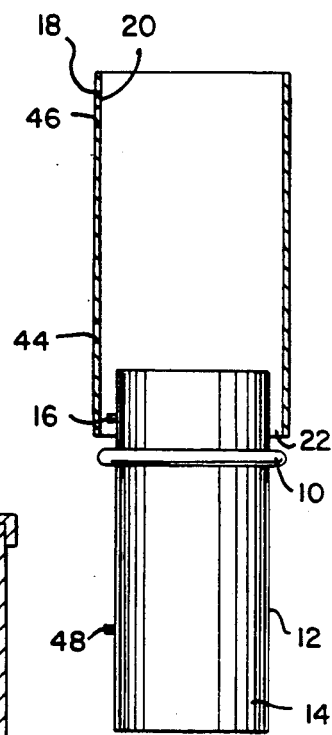
FIG. 3 shows an initial processing step in accordance with the method of the present invention.
Figure 4:
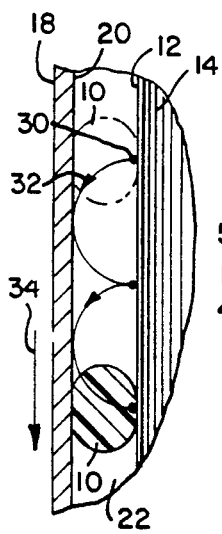
FIG. 4 illustrates rolling of the dam in accordance with the present invention.

Rolling dam 10 may initially be placed along either the outer surface 12 of tank 14 or the inner surface 20 of jacket 18, after which the tank and jacket are axially aligned, FIG. 3, and then at least one of the tank and jacket is axially moved toward the other to form annular space 22 and roll the dam in the annular space along outer surface 12 of tank 14 and inner surface 20 of jacket 18. It is preferred that dam 10 be initially stretched to move over spud 16 and be placed around tank 14 so that the dam does not have to roll over spud 16.

It is recognized that various equivalents, alternatives and modifications are possible within the scope of the appended claims.

I claim:

1. A method for making an insulated fluid storage unit comprising:
   providing an inner storage tank having an outer cylindrical surface with a relatively constant outer diameter;
   providing an outer jacket having an inner cylindrical surface with a relatively constant inner diameter greater than said outer diameter of said tank;
   providing an annular resilient compressible dam;
   placing said dam along one of said outer surface of said tank and said inner surface of said jacket;
   axially aligning said tank and said jacket such that an annular space exists between said tank and said jacket;
   axially moving at least one of said tank and said jacket toward the other of said tank and said jacket, with said dam spanning said annular space and engaging said outer surface of said tank and said inner surface of said jacket, thereby initiating movement of said dam a substantial and generally equal distance along each of said outer surface of said tank and said inner surface of said jacket by frictional rolling contact of said dam with said tank and said jacket;
   introducing foamed insulation as a liquid into said annular space; and
   allowing said liquid to harden to form an annular insulation layer around said tank, said dam preventing leakage of said liquid there past.

2. The method according to claim 1 further comprising providing said dam with a free-state inner diameter slightly less than said outer diameter of said tank, and a free-state outer diameter slightly greater than said inner diameter of said jacket, and providing said dam with a circular circumference in cross-section such that a point on said circumference moves substantially in a cycloid as said dam rolls in said annular space along said outer surface of said tank and said inner surface of said jacket.

3. The method according to claim 1 wherein said dam is made of a preformed polymeric material.

4. The method according to claim 3 wherein said dam is made of flexible urethane.

5. A method for making an insulated fluid storage unit comprising:
   providing an inner storage tank having an outer cylindrical surface with a relatively constant outer diameter;
   providing an outer jacket having an inner cylindrical surface with a relatively constant inner diameter greater than said outer diameter of said tank;
   providing an annular resilient compressible dam;
   placing said dam along one of said outer surface of said tank and said inner surface of said jacket;
   axially aligning said tank and said jacket such that an annular space exists between said tank and said jacket;
   axially moving at least one of said tank and said jacket toward the other of said tank and said jacket, with said dam spanning said annular space and engaging said outer surface of said tank and said inner surface of said jacekt, thereby initiating movement of said dam a substantial and generally equal distance along each of said outer surface of said tank and said inner surface of said jacket by frictional rolling contact of said dam with said tank and said jacket;
   thereby rolling said dam in said annular space along said outer surface of said tank and said inner surface of said jacket such that the portion of said dam rolling from the jacket inner surface to the tank outer surface arcuately compresses along said outer surface of said tank during said rolling, and the portion of said dam rolling from the tank outer surface to the jacket inner surface arcuately expands along said inner surface of said jacket during said rolling;
   introducing foamed insulation as a liquid into said annular space; and
   allowing said liquid to harden to form an annular insulation layer around said tank, said dam preventing leakage of said liquid there past.

* * * * *